United States Patent
Ahn

(10) Patent No.: US 7,334,602 B2
(45) Date of Patent: Feb. 26, 2008

(54) APPARATUS FOR CONTROLLING FLOW RATE OF GASES USED IN SEMICONDUCTOR DEVICE BY DIFFERENTIAL PRESSURE

(75) Inventor: Kang-Ho Ahn, 102-1504, Ichon Apt., Ichon-Dong, Yongsan-Gu, Seoul (KR)

(73) Assignees: Hyundai Calibration & Certification Technologies Co., Ltd., Kyungki-Do (KR); Kang-Ho Ahn, Seoul (KR)

( * ) Notice: Subject to any disclaimer, the term of this patent is extended or adjusted under 35 U.S.C. 154(b) by 139 days.

(21) Appl. No.: 10/562,158

(22) PCT Filed: Jun. 24, 2004

(86) PCT No.: PCT/KR2004/001533

§ 371 (c)(1),
(2), (4) Date: Dec. 23, 2005

(87) PCT Pub. No.: WO2005/001911

PCT Pub. Date: Jan. 6, 2005

(65) Prior Publication Data

US 2006/0151113 A1    Jul. 13, 2006

(30) Foreign Application Priority Data

Jun. 27, 2003   (KR)   ............... 10-2003-0042584

(51) Int. Cl.
G05D 7/06 (2006.01)

(52) U.S. Cl. ............... 137/487.5; 137/486; 137/557; 138/40; 73/861.52

(58) Field of Classification Search ............... 137/486, 137/487.5; 138/40–46; 73/861.52, 861.61, 73/861.62
See application file for complete search history.

(56) References Cited

U.S. PATENT DOCUMENTS

| | | | |
|---|---|---|---|
| 5,080,131 A * | 1/1992 | Ono et al. | 137/599.11 |
| 6,152,162 A | 11/2000 | Balazy et al. | |
| 6,539,968 B1 | 4/2003 | White et al. | |
| 6,557,574 B2 * | 5/2003 | Federspiel | 137/12 |
| 6,564,825 B2 * | 5/2003 | Lowery et al. | 137/487.5 |

FOREIGN PATENT DOCUMENTS

| | | |
|---|---|---|
| JP | 3 111 914 | 5/1991 |
| JP | 8 063 235 | 3/1996 |
| JP | 8 152 346 | 6/1996 |

\* cited by examiner

Primary Examiner—Ramesh Krishnamurthy
(74) Attorney, Agent, or Firm—Lowe Hauptman Ham & Berner

(57) ABSTRACT

Provided is apparatus for controlling flow rate of gases used in semiconductor device by differential pressure by generating differential pressure in a fluid path. A differential pressure generation element generates pressure difference in the fluid path of gases used in semiconductor device fabrication, a pressure, sensor which is installed at a bypass of the fluid path detects the pressure difference, and a central processing unit (CPU) measures and controls a flow rate of the gases, thereby the present invention is capable of controlling the flow rate precisely and rapidly, and enhancing the degree of purity of the gases by the filtering function of the differential pressure generation element itself.

6 Claims, 9 Drawing Sheets

APPARATUS FOR CONTROLLING FLOW RATE OF GASES USED IN SEMICONDUCTOR DEVICE BY DIFFERENTIAL PRESSURE

RELATED APPLICATIONS

The present application is based on International Application Number PCT/KR04/001533, filed Jun. 24, 2004, and claims priority from, Korean Application Number 10-2003-0042584, filed Jun. 27, 2003, the disclosure of which is hereby incorporated by reference herein in its entirety.

TECHNICAL FIELD

The present invention relates to an apparatus for controlling flow rate of gases used in semiconductor device fabrication by differential pressure, and more particularly, to an apparatus for controlling flow rate of gases used in semiconductor device fabrication by generating differential pressure in a flow passage through which the gas flows.

BACKGROUND ART

As well known, semiconductor device fabrication employs gases such as dopant gas, etchant gas, diffusion gas and purge gas used for manufacturing semiconductor devices. The semiconductor device fabrication requires that such gases have high purity. Further, the flow rates of the gases that determine characteristics of semiconductor devices should be precisely and rapidly controlled in semiconductor device fabrication.

As an example of techniques for controlling the flow rate of a gas in semiconductor device fabrication, a heat sensitive type mass flow rate controller operates as follows. A gas flowing though a flow passage of a body of the controller is distributed at a predetermined ratio via a bypass and then sent to a flow sensor. A thermal resistor of the flow sensor changes temperature by means of heat conduction according to the gas flow, a Wheatstone bridge detects the temperature change in the thermal resistor as a voltage change and outputs an electrical signal, and an amplifier amplifies the electrical signal from the Wheatstone bridge and inputs the amplified electrical signal into the controller. The controller compares the input electrical signal with a set point and opens or closes a control valve operated by a solenoid or thermal actuator based on the comparison results to control the flow rate of the gas.

However, the conventional heat sensitive type mass flow rate controller has a problem in that the flow rate of the gas is indirectly measured in such a manner that the temperature of the thermal resistor of the flow sensor is changed by heat capacity according to the gas flow and the temperature change in the thermal resistor is detected as the voltage change by the Wheatstone bridge, resulting in very low response. Further, the conventional heat sensitive type mass flow rate controller has problems in that it does not ensure linearity of the relationship between the flow rate and the electromotive force of the flow sensor throughout the entire range of flow rate of the gas, and its reliability is greatly deteriorated due to changes in the sensitivity of the flow sensor according to gas pressure. Moreover, the conventional heat sensitive type mass flow rate controller has a problem in that it is troublesome to change a compensation constant for use in the measurement of the flow rate according to the kind of gas.

DISCLOSURE OF INVENTION

The present invention is conceived to solve the aforementioned problems in the prior art. An object of the present invention is to provide an apparatus for controlling flow rate of gases used in semiconductor device by differential pressure, wherein differential pressure is generated in the gas flowing through a flow passage and the flow rate is measured using the differential pressure of the gas, thereby greatly improving the response and reliability of the controller.

Another object of the present invention is to provide an apparatus for controlling flow rate of gases used in semiconductor device by differential pressure, wherein the flow rate of the gas can be precisely and rapidly controlled due to a fast response speed of the controller and a stable flow of the gas.

A further object of the present invention is to provide an apparatus for controlling flow rate of gases used in semiconductor device by differential pressure, wherein the controller can be manufactured and maintained conveniently and economically due to its simple structure.

A still further object of the present invention is to provide an apparatus for controlling flow rate of gases used in semiconductor device by differential pressure, wherein the degree of purity of the gas can be improved by means of a filtering function of a differential pressure generation element itself that is installed in a flow passage and generates differential pressure in a flow of the gas.

According to the present invention for achieving the objects, there is provided an apparatus for controlling flow rate of gases used in semiconductor device by differential pressure, which comprises a body having a flow passage for the gas used in the semiconductor device fabrication, a control valve for controlling a flow of the gas by opening or closing the flow passage of the body, a differential pressure generation element installed in the flow passage of the body to generate differential pressure, a tube installed to penetrate through the differential pressure generation element, a pressure sensor received in the tube to detect the differential pressure in the flow passage generated by the differential pressure generation element, and a central processing unit for calculating the flow rate of the gas according to a detection signal input from the pressure sensor and controlling the control valve.

BEST MODE FOR CARRYING OUT THE INVENTION

Figure 1:
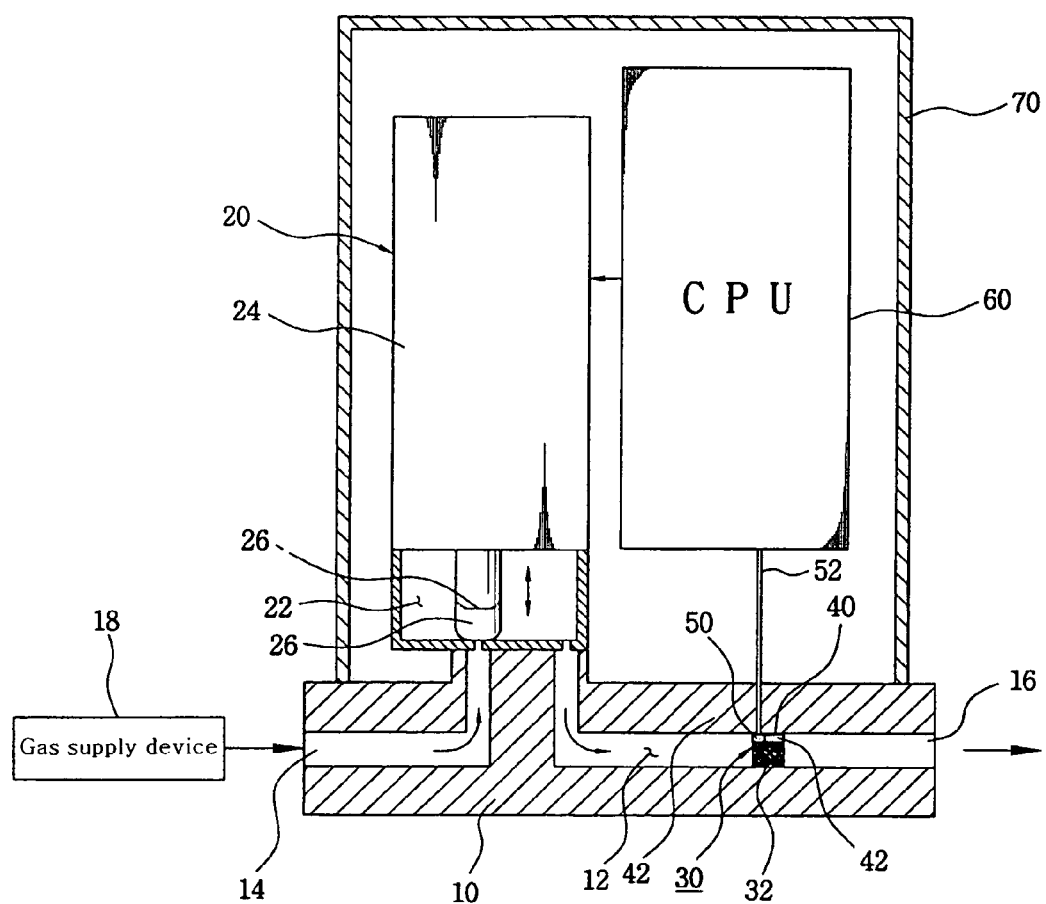
FIG. 1 is a sectional view showing the configuration of a first embodiment of an apparatus for controlling flow rate of gases used in semiconductor device by differential pressure according to the present invention.
Figure 2:
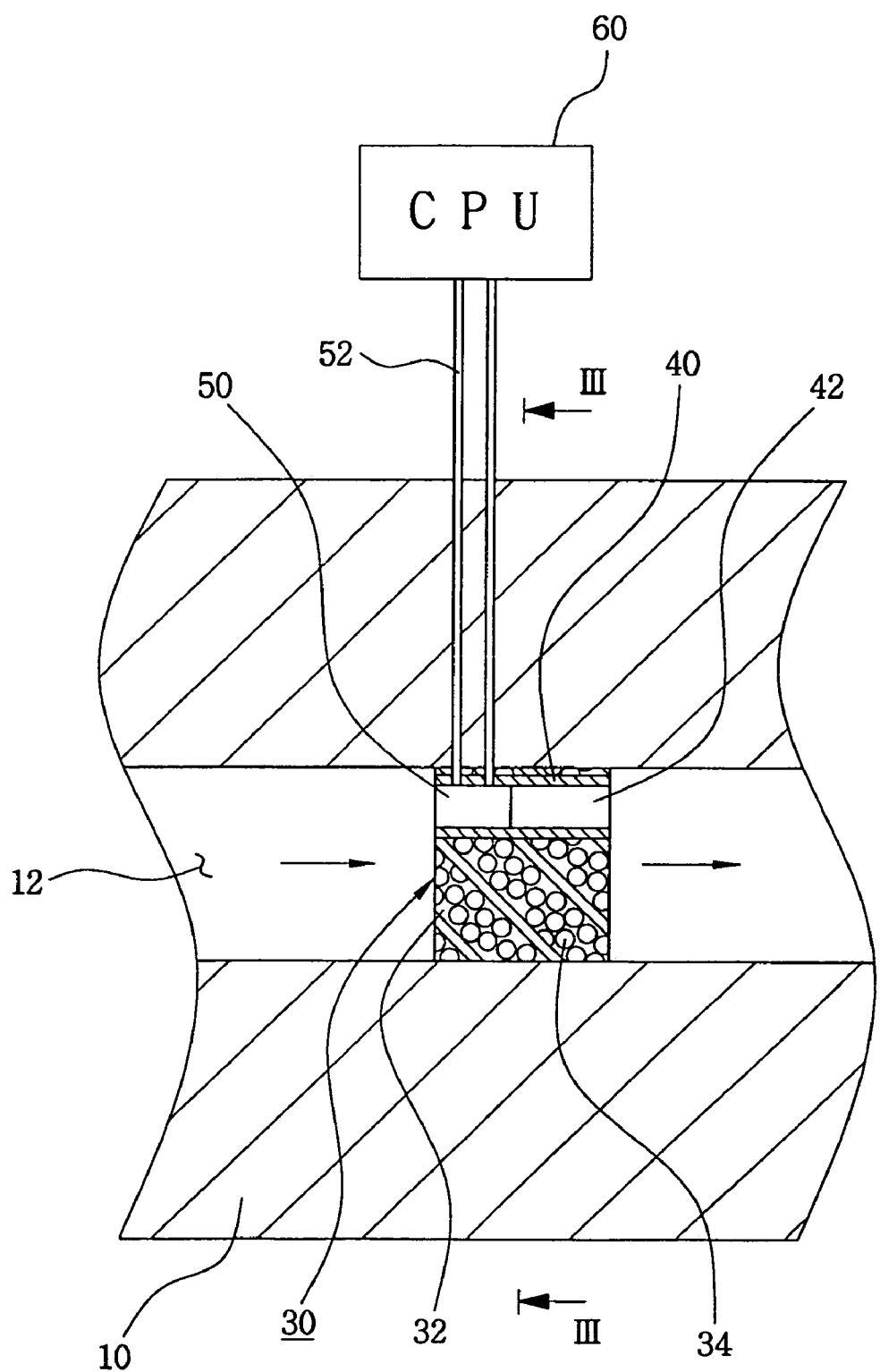
FIG. 2 is a partially enlarged sectional view showing the configuration of the first embodiment of an apparatus for controlling flow rate of gases used in semiconductor device by differential pressure according to the present invention.
Figure 3:
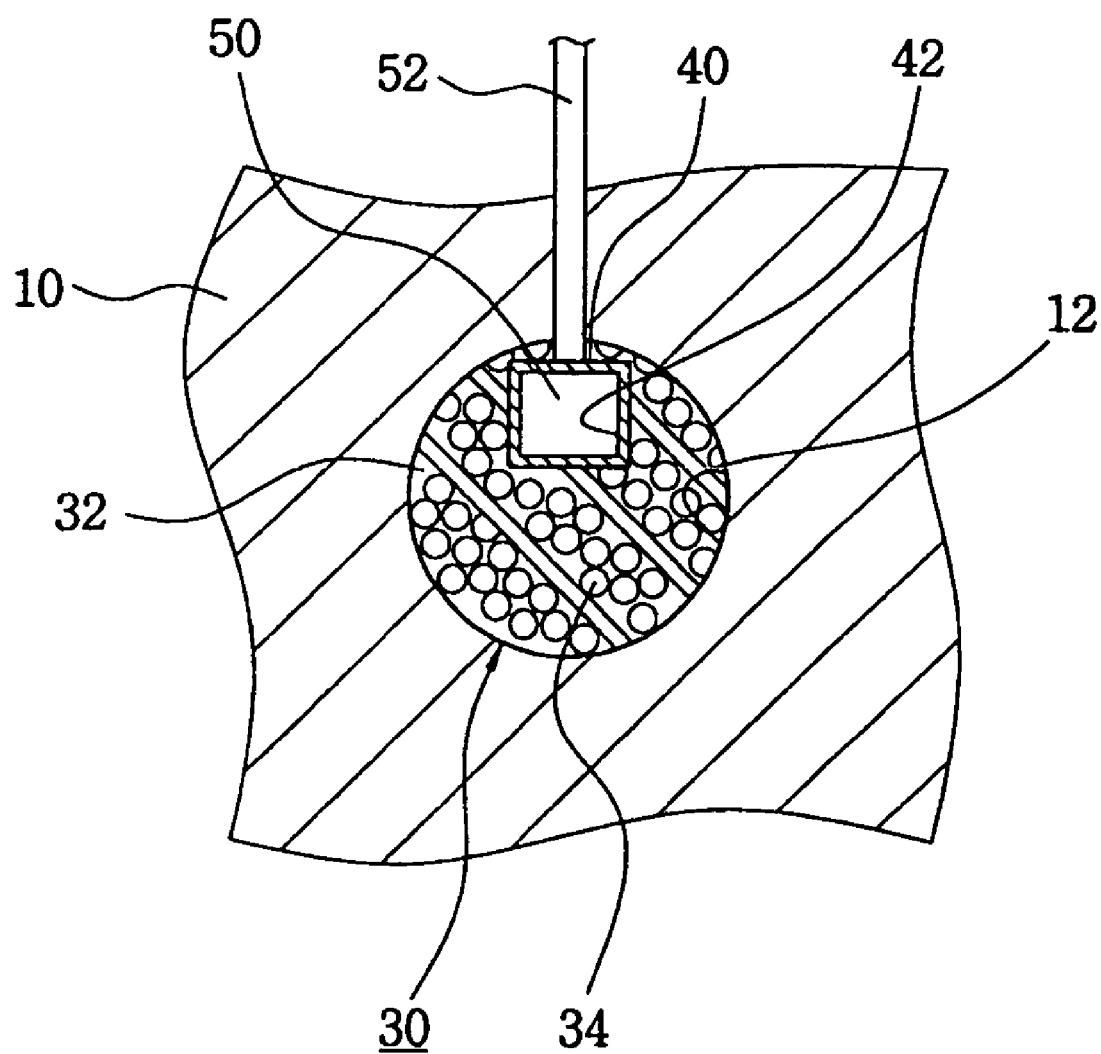
FIG. 3 is a sectional view taken along line III-III of FIG. 2.

A first embodiment of an apparatus for controlling flow rate of gases according to the present invention shown in FIGS. 1 to 3 will be first described. Referring to FIGS. 1 and 2, a body 10 defining the external appearance of the apparatus for controlling flow rate of gases according to the present invention is formed with a flow passage 12 for gases such as dopant, etchant, diffusion and purge gasses used in semiconductor device fabrication. The flow passage 12 has a gas inlet 14 and a gas outlet 16. The inlet 14 is connected to a gas supply device 18. The gas discharged through the outlet 16 is supplied to a semiconductor device fabrication process. An upstream portion of the flow passage 12 is connected to a valve chamber 22 of a control valve 20. The valve chamber 22 of the control valve 20 is provided with a valve body 26 for opening or closing the flow passage 12 by means of an operation of an actuator 24 so as to control the flow of the gas. In this embodiment, the actuator 24 of the control valve 20 may comprise a solenoid.

Referring to FIGS. 1 to 3, the apparatus for controlling flow rate of gases of the present invention has a differential pressure generation element 30 installed at a downstream portion of the flow passage 12 to generate differential pressure in the flow of the gas. The differential pressure generation element 30 is formed of a porous material 32 for producing resistance against the flow of the gas. The porous material 32 comprises a ceramic filter or stainless steel filter having a plurality of fine pores 34. The ceramic filter or stainless steel filter may be made by means of sintering. Further, the stainless steel filter can be made to have a surface with superior precision, cleanliness, chemical stability, corrosion resistance and the like by means of electropolishing. Such a ceramic filter or stainless steel filter can effectively adsorb and remove impurities contained in the gas penetrating through the pores.

As specifically shown in FIG. 3, the apparatus for controlling flow rate of gases of the present invention has a tube 40 installed at an upper edge of the porous material 32 to penetrate therethrough along the flow direction of the gas. A pressure sensor 50 for sensing pressure is received in a bore 42 of the tube 40. In this embodiment, the pressure sensor 50 is adapted to maintain a hermetic seal and may comprise a differential pressure sensor for sensing differential pressure produced between upstream and downstream sides of the porous material 32.

As shown in FIGS. 1 and 2, the porous material 32 and the tube 40 are identical with each other in length, and the pressure sensor 50 has a length shorter than that of the tube 40 and is received at one side of the tube 40. The lengths of the porous material 32, tube 40 and pressure sensor 50 may be changed properly, if necessary. The position of the pressure sensor 50 may be changed to any position within the tube 40. Although FIG. 3 shows that the tube 40 and the pressure sensor 50 have rectangular cross sections, the tube 40 and the pressure sensor 50 may be formed to have circular cross sections.

Meanwhile, leads 52 of the pressure sensor 50 penetrate through the tube 40, the porous material 32 and the body 10 and are then connected to a central processing unit (CPU) 60. A detection signal of the pressure sensor 50 is inputted into the CPU 60. The CPU 60 operates the actuator 24 of the control valve 20 according to the detection signal input from the pressure sensor 50 to open or close the flow passage 12, thereby controlling the flow of the gas. The control valve 20 and the CPU 60 are received in a casing 70 that is detachably attached to the body 10.

In the apparatus for controlling flow rate of gases used in semiconductor device by differential pressure according to the present invention, the gas that is supplied from the gas supply device 18 when the valve body 26 of the control valve 20 is opened is introduced through the inlet 14 of the body 10 and then flows along the flow passage 12 of the body 10 while sequentially passing through the valve chamber 22 and the pores 34 of the porous material 32. The pressure of the gas drops while the gas passes through the pores 34 of the porous material 32, which have cross sectional areas narrower than that of the flow passage 12. Therefore, a pressure difference is produced between the upstream and downstream sides of the porous material 32.

Then, the pressure sensor 50 received in the bore 42 of the tube 40 detects the differential pressure produced between the upstream and downstream sides of the porous material 32 and outputs the detection signal corresponding thereto. The CPU 60 compares the detection signal input from the pressure sensor 50 with a set point and then obtains the flow rate of the gas. At this time, if the flow of the gas passing through the pores 34 of the porous material 32 is a laminar flow, the correlation between the detection signal of the pressure sensor 50 and an actual flow rate is linear. Thus, it is possible to greatly improve response to and reliability for the flow rate of the gas obtained by the CPU 60.

Further, the CPU 60 determines whether the flow rate of the gas obtained is a predetermined proper flow rate. The CPU 60 also outputs a control signal for operating the actuator 24 of the control valve 20 to properly maintain the flow rate of the gas. The valve body 26 opens or closes the flow passage 12 by means of the operation of the actuator 24 to control the flow of the gas.

Accordingly, the response characteristics and reliability can be greatly improved in such a manner that the pressure sensor 50 detects the differential pressure produced between the upstream and downstream sides of the porous material 32, the CPU 60 calculates the flow rate of the gas, and the valve body 26 of the control valve 20 for opening or closing the flow passage controls the flow rate of the gas. In addition, the flow rate of the gas can be precisely and rapidly controlled to be adapted to semiconductor device fabrication. The apparatus for controlling flow rate of gases of the present invention can be manufactured conveniently and at a low cost using a simple structure in which the porous material 32 is installed in the flow passage 12 of the body 10 and the pressure sensor 50 detects the differential pressure in the gas due to the porous material 32. The porous material 32 and the pressure sensor 50 can be replaced easily and the maintenance thereof can be made economically due to easy and convenient repairs. A trace of impurities contained in the gas passing through the pores 34 of the porous material 32 is adsorbed and removed by the pores 34, resulting in effective improvement of the degree of purity of the gas.

Figure 4:
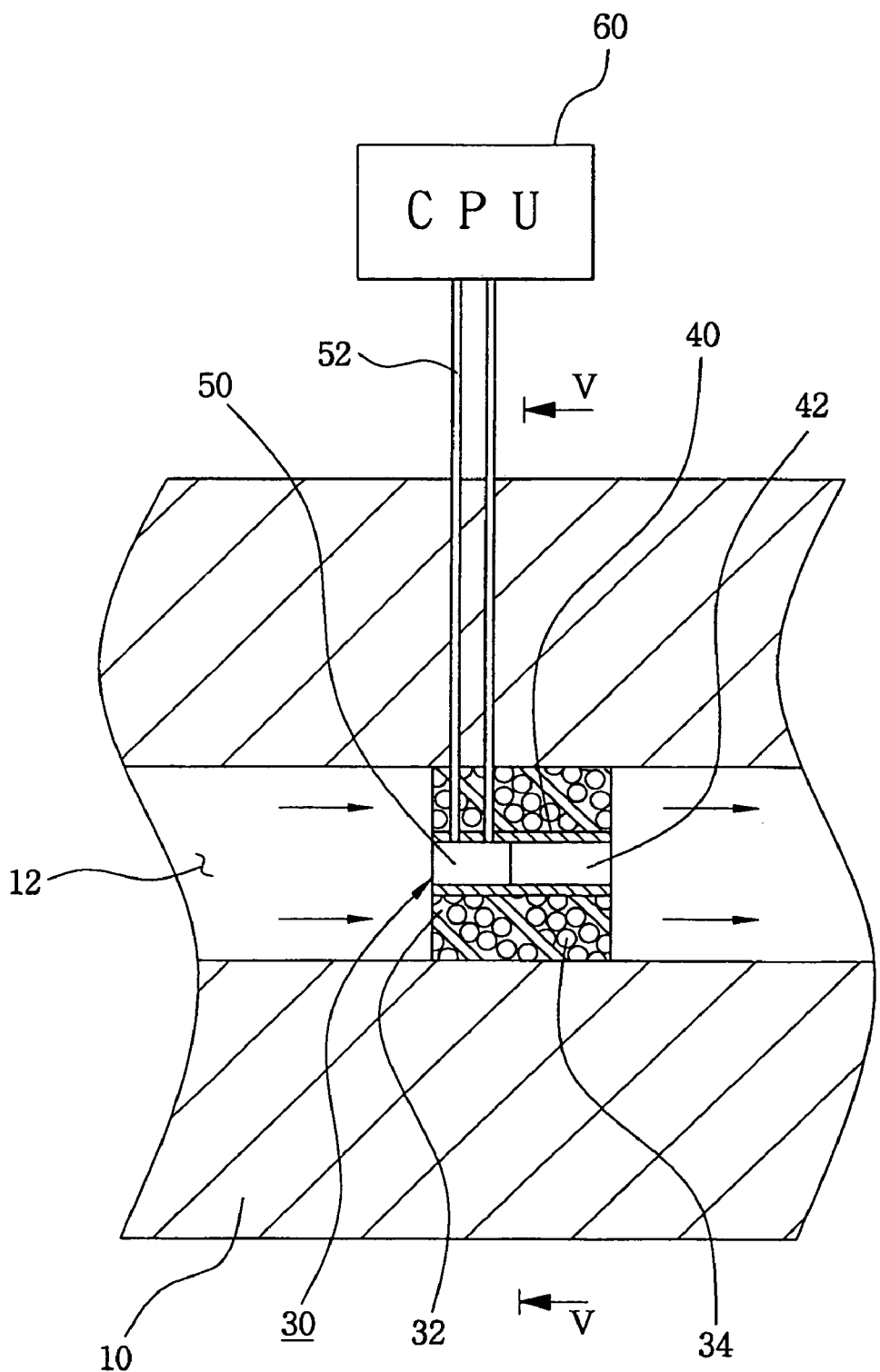
FIG. 4 is a partially enlarged sectional view showing the configuration of a second embodiment of apparatus for controlling flow rate of gases used in semiconductor device by differential pressure according to the present invention.
Figure 5:
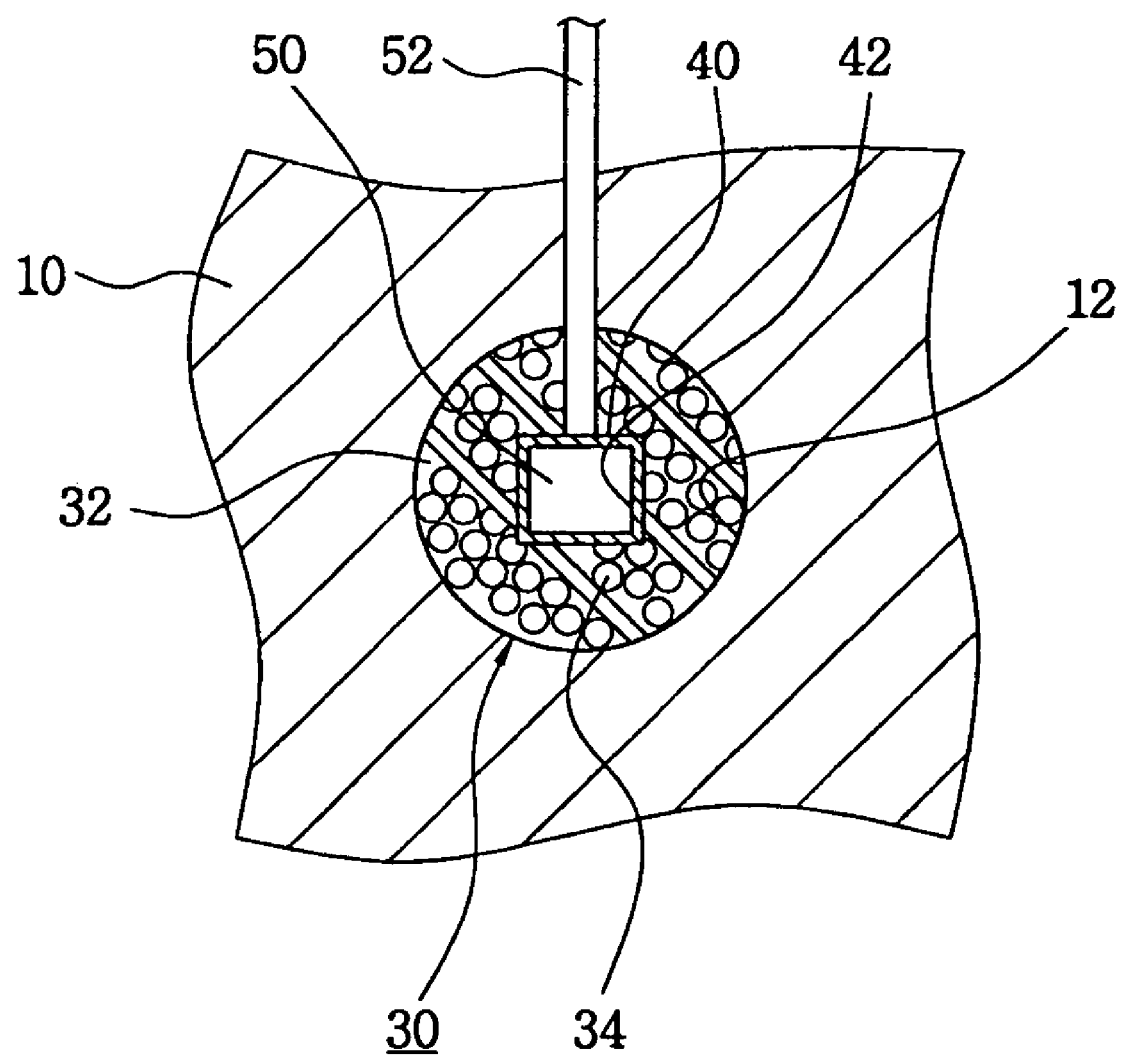
FIG. 5 is a sectional view taken along line V-V of FIG. 4.

FIGS. 4 and 5 show the configuration of a second embodiment of an apparatus for controlling flow rate of gases according to the present invention. The configuration and operation of the apparatus for controlling flow rate of gases according to the second embodiment is substantially identical with those of the apparatus for controlling flow rate of gases according to the first embodiment described above. Referring to FIGS. 4 and 5, the porous material 32 is installed in the flow passage 12 of the body 10, and the tube 40 is installed at the center of the porous material 32 to penetrate therethrough along the flow direction of the gas. The leads 52 of the pressure sensor 50 are received in a bore 42 of the tube 40 and penetrate through the tube 40, the porous material 32 and the body 10 and are then connected to the CPU 60 in the same manner as FIG. 1.

With the structure in which the tube 40 and the pressure sensor 50 are installed at the center of the porous material 32, the gas flows through the porous material 32 around the pressure sensor 50 disposed at the center of the flow passage 12. The pressure sensor 50 acts as a resistor for producing resistance against the flow of the gas in the flow passage 12 of the body 10. As shown in FIGS. 2 and 3, in the apparatus for controlling flow rate of gases according to the first embodiment in which the tube 40 and the pressure sensor 50 are installed at the upper edge of the porous material 32 to be in the vicinity of a wall surface of the flow passage 12, there are dead volumes upstream and downstream of the contact portion of the pressure sensor 50 with an upper wall surface of the flow passage 12 due to the pressure sensor 50 acting as the resistor against the flow of the gas. In the apparatus for controlling flow rate of gases according to the second embodiment, the flow of the gas is established through the porous material 32 around the pressure sensor 50, thereby preventing the creation of such dead volumes. Therefore, the apparatus for controlling flow rate of gases according to the second embodiment has advantages in that the flow of the gas can be smoothly maintained and it has excellent response over the apparatus for controlling flow rate of gases according to the first embodiment.

Figure 6:
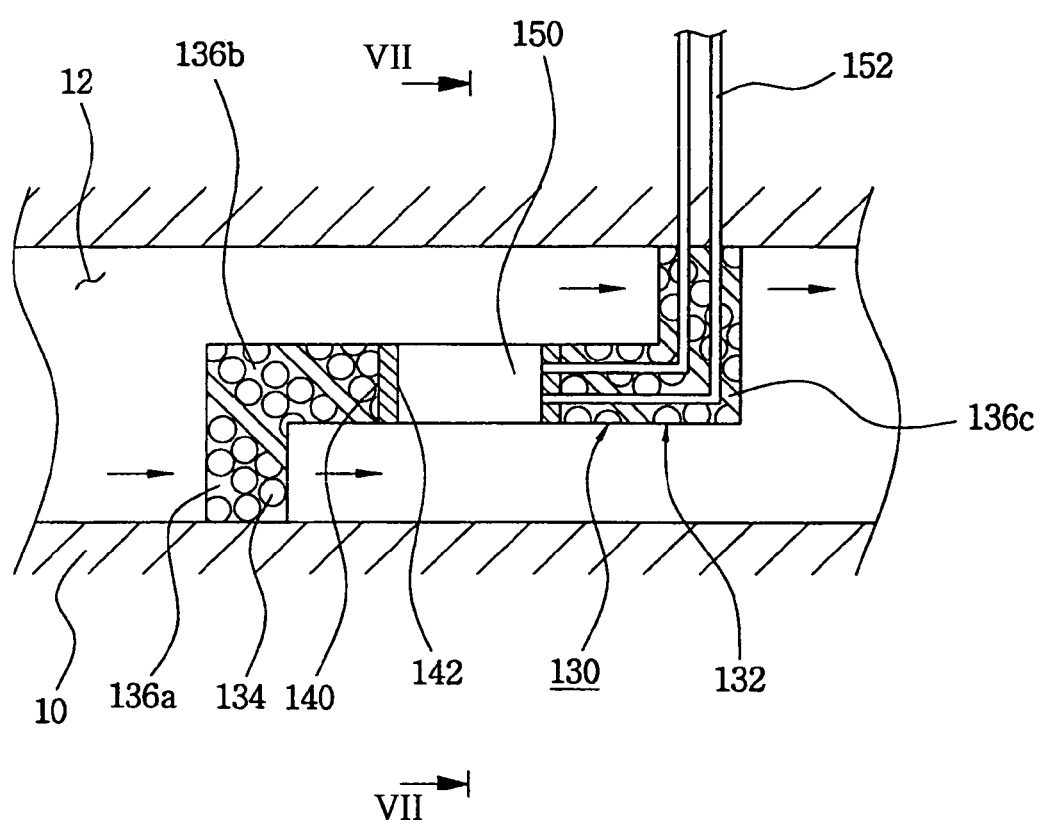
FIG. 6 a partially enlarged sectional view showing the configuration of a third embodiment of the apparatus for controlling flow rate of gases used in semiconductor device by differential pressure according to the present invention.
Figure 7:
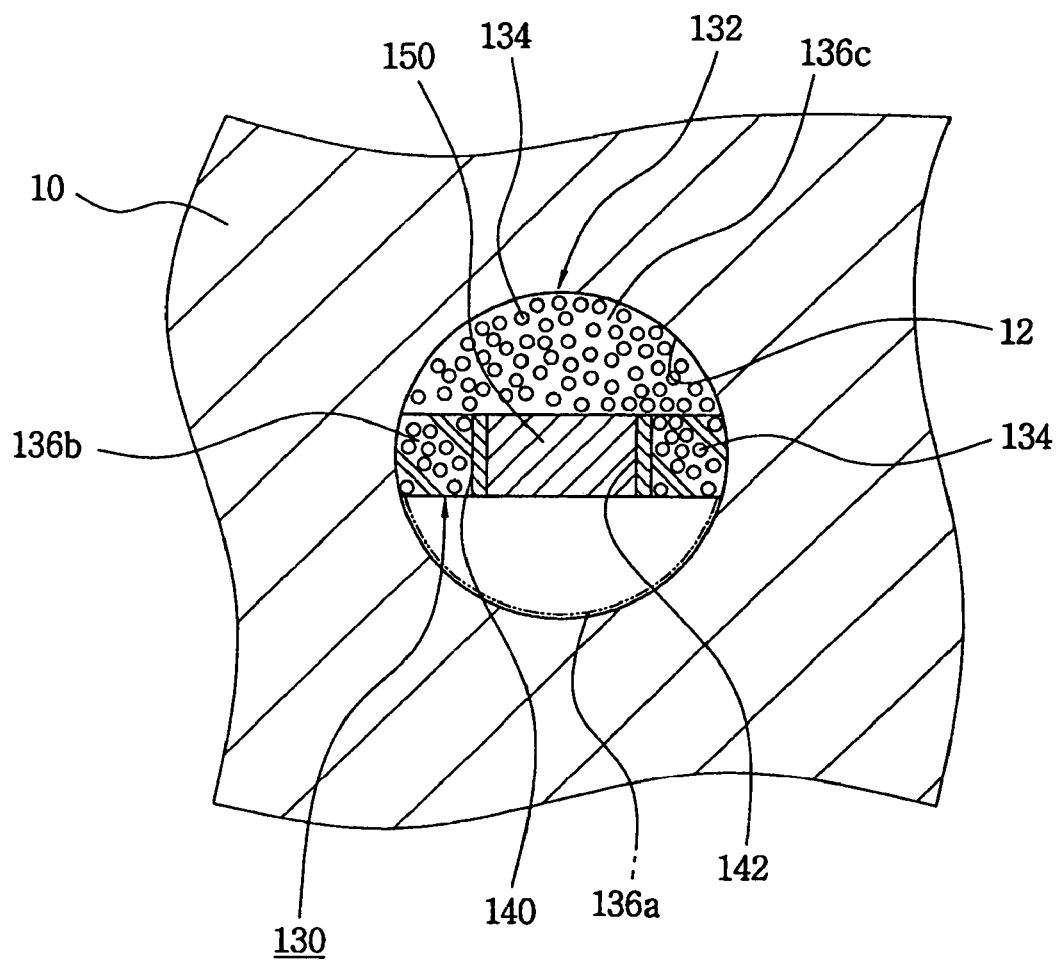
FIG. 7 is a sectional view taken along line VII-VII of FIG. 6.

FIGS. 6 and 7 show the configuration of a third embodiment of the apparatus for controlling flow rate of gases according to the present invention. The apparatus for controlling flow rate of gases according to the third embodiment also comprises the body 10, the control valve 20, the CPU 60 and the casing 70 in the same manner as the apparatus for controlling flow rate of gases according to the first embodiment. Referring to FIGS. 6 and 7, a porous material 132 acting as the differential pressure generation element 30 is installed in the flow passage 12 of the body 10, and the porous material 132 is formed of a ceramic filter or stainless steel filter having a plurality of pores 134.

The porous material 132 comprises a first vertical plate portion 136a vertically abutting on a lower wall surface of the flow passage 12, a horizontal plate portion 136b horizontally extending from a downstream end of the first vertical plate portion 136a, and a second vertical plate portion 136c vertically extending from a downstream end of the horizontal plate portion 136b and abutting on the upper wall surface of the flow passage 12. The horizontal plate portion 136b of the porous material 132 is provided with a tube 140 therethrough vertically, i.e. perpendicularly to the flow direction of the gas. A pressure sensor 150 is received in a bore 142 of the tube 140 in a hermetically sealed manner. Leads 152 of the pressure sensor 150 penetrate through the tube 140, the horizontal plate portion 136b and the second vertical plate portion 136c of the porous material 132, and the body 10 and are then connected to the CPU 60 in the same manner as FIG. 1.

In the apparatus for controlling flow rate of gases according to the third embodiment constructed as above, the gas introduced through the inlet 14 of the body 10 flows along the flow passage 12 while passing through the respective pores 134 of the first and second vertical plate portions 136a and 136c. At this time, there is a drop in the pressure of the gas that has passed through the pores 134 having cross sectional areas narrower than that of the flow passage 12, and a pressure difference is produced between above and below the horizontal plate portion 136b. The pressure sensor 150 received in the bore 142 of the tube 140 detects the differential pressure between above and below the horizontal plate portion 136b and outputs a detection signal. The CPU 60 compares the detection signal input from the pressure sensor 150 with a set point, obtains the flow rate of the gas, and then controls the flow of the gas by opening or closing the flow passage 12 through the operation of the actuator 24 of the control valve 20 in the same manner as described above.

Meanwhile, since the pressure sensor 150 is installed parallel with the flow direction of the gas in the apparatus for controlling flow rate of gases according to the third embodiment shown in FIG. 6, the area of the face of the pressure sensor 150 viewed in the flow direction of the gas is greatly reduced as compared with the area of the face of the pressure sensor 50 shown in FIGS. 3 and 4. Such reduction in the area of the face of the pressure sensor 150 results in reduction of a drag force as compared with the pressure sensor 50. Accordingly, flow loss can be minimized.

Figure 8:
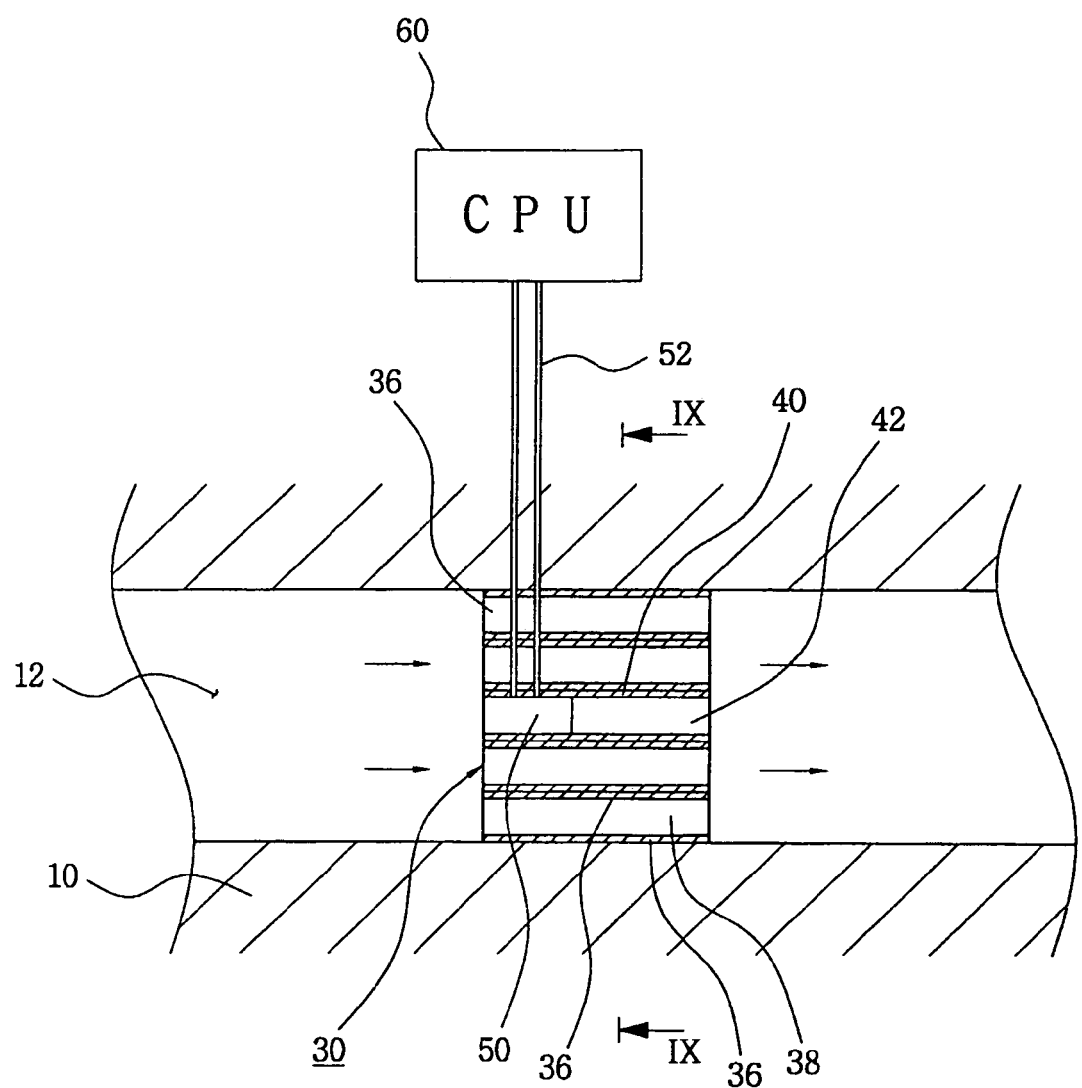
FIG. 8 a partially enlarged sectional view showing the configuration of a fourth embodiment of the apparatus for controlling flow rate of gases used in semiconductor device by differential pressure according to the present invention.
Figure 9:
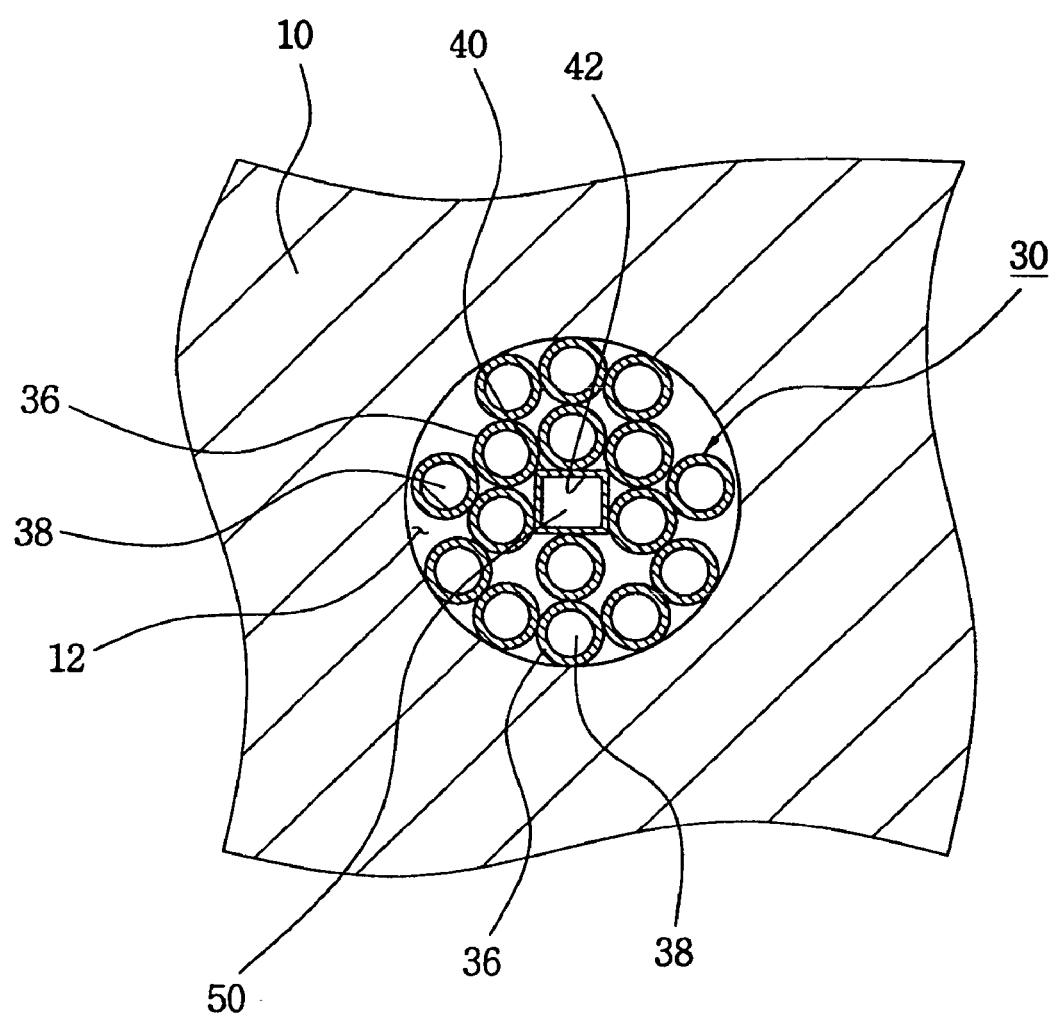
FIG. 9 is a sectional view taken along line IX-IX of FIG. 8.

FIGS. 8 and 9 show the configuration of a fourth embodiment of the apparatus for controlling flow rate of gases according to the present invention. The apparatus for controlling flow rate of gases according to the fourth embodiment also comprises the body 10, the control valve 20, the CPU 60 and the casing 70 in the same manner as the apparatus for controlling flow rate of gases according to the first embodiment. Referring to FIGS. 8 and 9, a plurality of capillary tubes 36 as another example of the differential pressure generation element 30 are installed in the flow passage 12 of the body 10 along the flow direction of the gas to produce resistance against the flow of the gas. Impurities contained in the gas passing through apertures 38 of the capillary tubes 36 are adsorbed and removed by surfaces of the apertures 38. The capillary tubes 36 are made of a stainless steel material and then subjected to electropolishing in the same manner as the porous material 32 of the apparatus for controlling flow rate of gases according to the first embodiment. The capillary tubes 36 as the differential pressure generation element 30 may be substituted with a porous plate. Surfaces of the capillary tubes 36 or the porous plate may be coated with glass, if necessary.

Further, the tube 40 is installed at the center of each of the capillary tubes 36 along the flow direction of the gas, and the pressure sensor 50 is installed in the bore 42 of the tube 40. In this embodiment, the capillary tubes 36 and the tubes 40 may be constructed to be equal to each other. In this case, the pressure sensor 50 may be installed in one of the capillary tubes 36. The leads 52 of the pressure sensor 50 penetrate through the capillary tubes 36 and the body 10 and are then connected to the CPU 60 in the same manner as FIG. 1.

Meanwhile, the pressure of the gas that has passed through the apertures 38 of the capillary tubes 36 drops in the same manner as the porous material 32 described above. The pressure sensor 50 detects differential pressure between upstream and downstream sides of the capillary tubes 36 and outputs a detection signal. The CPU 60 compares the detection signal input from the pressure sensor 50 with a set point, obtains the flow rate of the gas, and then controls the flow of the gas by operating the actuator 24 of the control valve 20 in the same manner as described above. Impurities contained in the gas passing through the apertures 38 of the capillary tubes 36 are adsorbed and removed by the inner surfaces of the apertures 38. Accordingly, the degree of purity of the gas can be effectively improved.

The preferred embodiments of the present invention described above are merely for illustrative purposes. The scope of the present invention is not limited to the embodiments. Those skilled in the art can make various changes, modifications or substitutions within the technical sprit and scope of the present invention defined by the appended claims. It should be understood that such embodiments fall within the scope of the present invention.

Further, although the present invention has been described in connection with control of the flow rate of a gas used in semiconductor device fabrication, it can also be applied to control of the flow rate of a gas or other fluids used in a chemical process.

INDUSTRIAL APPLICABILITY

As described above, with the apparatus for controlling flow rate of gases for control ling a gas used in semiconductor device fabrication according to the present invention, a differential pressure generation element such as a porous material or capillary tubes is installed in a flow passage of the gas to generate differential pressure in the gas flowing along the flow passage, and the flow rate of the gas is measured based on the differential pressure in the gas, thereby greatly improving response characteristics and reliability. Further, it is possible to precisely and rapidly control the flow rate of the gas due to a fast response speed and stable flow of the gas. Moreover, there are advantages in that manufacture and maintenance of the apparatus for controlling flow rate of gases can be made conveniently and economically due to its simple structure, and the degree of purity of the gas can be improved by means of a filtering function of the differential pressure generation element itself that is installed in the flow passage and generates the differential pressure in the flow of the gas.

The invention claimed is:

1. An apparatus for controlling flow rate of gases used in semiconductor device fabrication by differential pressure, comprising:

a body having a flow passage for the gas used in the semiconductor device fabrication;

a control valve for controlling a flow of the gas by opening or closing the flow passage of the body;

a differential pressure generation element installed in the flow passage of the body to generate differential pressure;

a tube installed to penetrate through the differential pressure generation element;

a pressure sensor received in the tube to detect the differential pressure in the flow passage generated by the differential pressure generation element; and a central processing unit for calculating the flow rate of the gas according to a detection signal input from the pressure sensor and controlling the control valve.

2. The apparatus as claimed in claim 1, wherein the differential pressure generation element comprises a porous material.

3. The apparatus as claimed in claim 2, wherein the tube is installed to penetrate through the center of the porous material.

4. The apparatus as claimed in claim 1, wherein the differential pressure generation element comprises a porous material having a first vertical plate portion vertically abutting on a lower wall surface of the flow passage, a horizontal plate portion horizontally extending from a downstream end of the first vertical plate portion, and a second vertical plate portion vertically extending from a downstream end of the horizontal plate portion and abutting on an upper wall surface of the flow passage.

5. The apparatus as claimed in claim 4, wherein the tube is installed at the horizontal plate portion of the porous material to penetrate therethrough perpendicularly to a flow direction of the gas, and the pressure sensor is horizontally received in the tube.

6. The apparatus as claimed in claim 1, wherein the differential pressure generation element comprises a plurality of capillary tubes installed along a flow direction of the gas.

* * * * *